(12) United States Patent
Barrett et al.

(10) Patent No.: US 8,014,273 B1
(45) Date of Patent: Sep. 6, 2011

(54) DYNAMIC FEEDBACK FROM AN INTERNET SERVICE PROVIDER ABOUT NETWORK OCCUPANCY/AVAILABILITY

(75) Inventors: Karen L. Barrett, Chatswood (AU); Siobhan Buckley, Sydney (AU); Ciaran Gannon, Sydney (AU); Muneyb Minhazuddin, Quakers Hill (AU)

(73) Assignee: Avaya Inc., Basking Ridge, NJ (US)

( * ) Notice: Subject to any disclaimer, the term of this patent is extended or adjusted under 35 U.S.C. 154(b) by 793 days.

(21) Appl. No.: 11/209,403

(22) Filed: Aug. 22, 2005

(51) Int. Cl.
*H04J 11/00* (2006.01)

(52) U.S. Cl. .................................... 370/210; 709/226

(58) Field of Classification Search ............... 370/467, 370/352, 400, 392; 455/450
See application file for complete search history.

(56) References Cited

U.S. PATENT DOCUMENTS

| | | | |
|---|---|---|---|
| 5,031,195 A | 7/1991 | Chevillat et al. | |
| 6,405,364 B1* | 6/2002 | Bowman-Amuah | 717/101 |
| 6,490,271 B1* | 12/2002 | Erjanne | 370/347 |
| 6,587,433 B1* | 7/2003 | Borella et al. | 370/230 |
| 2002/0044567 A1* | 4/2002 | Voit et al. | 370/467 |
| 2003/0046396 A1* | 3/2003 | Richter et al. | 709/226 |
| 2005/0226153 A1* | 10/2005 | Scifres et al. | 370/232 |

OTHER PUBLICATIONS

Chan, et al., RFC3084: *COPS Usage for Policy Provisioning (COPS-PR)*, Network Working Group Request for Comments: 3084 Category: Standards Track, pp. 1-34, internet address: http://rfc3084.x42.com/, Mar. 2001.

Handley, M. and Jacobson, V., *Comment on RFC 2327/RFC 2327-SDP*: Session Description Protocol, Internet RFC/STD/FYI/BCP Archives, pp. 1-31, internet address: http://www.faqs.org/rfcs/rfc2327.html, Apr. 1998.

Stoddard, I., *Re: [Imail Forum] Imail Performance & Best Practices?* (*Coming soon*) . . . , internet address: http://www.mail-archive.com/imail_forum@list.ipswitch.com/msg65913.html, Mar. 24, 2003.

RFID Journal, *Frequently Asked Questions*, Manufacturing, available at http://www.rfidjournal.com/article/articleview/207, 7 pages, (Updated 2003).

RFID, *Tracking Everything, Everywhere*, by Katherine Albrecht, available at http://www.stoprfid.org/rifd_overview.htm, 7 pages, (Updated 2003).

RFID, *Wikipedia, the free encyclopedia*, available at http://en.wikipedia.org/wiki/RFID, 3 pages (Updated May 31, 2004).

* cited by examiner

*Primary Examiner* — Dang T Ton
*Assistant Examiner* — Wei Zhao
(74) *Attorney, Agent, or Firm* — Sheridan Ross P.C.

(57) ABSTRACT

In one embodiment, the present invention is directed to a system for providing user access to a public network that includes (a) a service modification agent 154 operable to (i) determine that public network resources are available for use; (ii) determine that a first class of users will be offered an upgrade in a Quality of Service (QoS) of communications over the public network; and (iii) determine that a first user in the first class of users may intend to use the public network resources and a service reporting agent 166 operable to provide the user with the higher QoS when the first user accesses the public network.

24 Claims, 5 Drawing Sheets

Additional bandwidth may currently be available. If you wish to be eligible for a service level upgrade, please select one of the following to describe the service that you wish to use:

☐ Video Telephone Call

☐ Video Conference Call

☐ E-Mail Access

☐ Instant Messaging Session

☐ Web Browsing Session

☐ Text Chat

☐ Voice Over IP Call

☐ Other

*Fig. 6*

We are currently experiencing high Internet Usage. Expect your communication quality to degrade in 5 minutes.

DYNAMIC FEEDBACK FROM AN INTERNET SERVICE PROVIDER ABOUT NETWORK OCCUPANCY/AVAILABILITY

FIELD

The invention relates generally to distributed networks and particularly to bandwidth usage in distributed networks.

BACKGROUND

Public Wide Area Networks are growing rapidly in popularity. A "public network" is a network operated by common carriers or telecommunications administrations for the provision of circuit switched, packet switched, and leased-line circuits in the public. The Internet and World Wide Web are common examples of public networks. In contrast, a "private network" refers to a network owned by an end user organization and/or a network comprising dedicated circuits leased by an end user organization from one or more public carriers. An enterprise network is a common example of a private network.

Each year more users use the Internet for a variety of purposes, including electronic commerce, interpersonal communications, information acquisition, and the like. An integral part of this rise in Internet popularity is the Internet Service Provider or ISP. The ISP is a vendor that provides access for customers, whether companies or private individuals, to the Internet and World Wide Web. The ISP also typically provides a core group of Internet utilities and services, like E-mail, News Group Readers, and, sometimes, weather reports and local restaurant reviews. The user typically reaches his ISP by either dialing-up with their own computer, modem and phone line, or over a dedicated line, such as a Digital Subscriber Line or DSL, installed by a telephone company. An ISP is also called a TSP, for Telecommunications Service Provider, and an ITSP for Internet Telephony Service Provider.

Typically the ISP provides different types of services (e.g., gold, silver and bronze) to enterprise customers with an expense charging model. The enterprise network administrator generally administers a policy server and/or Access Control Lists (ACL) (a set of rules for filtering traffic based on packet header variables such as IP address, transport protocol, and port number) on the enterprise edge egress router or uses traffic shaping devices, such as the Packet Shaper™ by Packeteer™ and QoSWorks™ by Sitara Networks™ to comply with the various Service Level Agreements (SLA's) between the ISP and its various customers. "Traffic shaping" refers to congestion and management procedures in which data traffic is regulated to conform to a specified, desirable behavior pattern, such as reduction or elimination of excessive traffic bursts.

An SLA is an agreement between a user and a service provider, defining the nature of the service to be provided and establishing a set of metrics or measurements to be used to measure the level of service provided measured against the agreed level of service. Such service levels might include provisioning, average availability, restoration times for outages, availability, average and maximum periods of outage, average and maximum response times, minimum bandwidth level, minimum Quality of Service or QoS parameters, delivery rates (e.g., average through minimum throughput, etc.). Residential users having only modem connections rather than DSL connections typically do not have an SLA.

The ISP may use Policy-Based Routing (PBR) (which routes packets pursuant to nontechnical policy considerations, such as permissions and reciprocal business contacts between and among backbone carriers, ISP's, and Internet Access Providers) and/or Constraints-Based Routing (CBR) (which routes packets based on technical considerations, such as selecting a route complying with Quality of Service or QoS requirements (e.g., packet delay, jitter, and/or packet loss)). The routing protocol is often associated with label switching protocols, such as Frame Relay, Asynchronous Transfer Mode or ATM, or MultiProtocol Label Switching or MPLS (which uses packet labeling to expedite routing), and uses the IP packet header Type of Service or TOS byte, to provision the network for different types of services.

Notwithstanding the relatively high level of sophistication of ISP's, the increased usage of the Internet has caused increased levels of congestion of scarce Internet resources and has required the implementation of protocols to provide circuit-switched-like QoS levels to Internet users for certain demanding applications. An example is the Resource ReSerVation Protocol or RSVP. RSVP supports resource reservations through networks of varying topologies and media. Through RSVP, a user's QoS requests are propagated to all routers along the path, allowing the network to reconfigure itself (at all network levels) to meet the desired level of service. The RSVP protocol engages network resources by establishing flows throughout the network. A "flow" is a network path associated with one or more senders, one or more receivers, and a certain QoS. A sending host wishing to send data that requires a certain QoS will send Unicast "path" messages toward the intended recipients. The path messages, which describe the bandwidth requirements and relevant parameters of the data to be sent, are propagated to all intermediate routers along the path. A receiving host, interested in the particular data, will confirm the flow (and the network path) by sending "reserve" messages through the network, describing the bandwidth characteristics of data it wishes to receive from the sender. As these reserve messages propagate back toward the sender, intermediate routers, based on bandwidth capacity, decide whether or not to accept the proposed reservation and commit resources. If an affirmative decision is made, the resources are committed and reserve messages are propagated to the next hop on the path from source to destination. For a premium price, RSVP enables certain traffic, such as a videoconference, to be delivered before e-mail. This is contrary to the historic configuration of the Internet in which all traffic moves on a first-come-first-served basis and is charged at a flat rate. RSVP, however, is not scalable, and it is not practical to enable RSVP on all of the routers end-to-end.

Currently, the Internet does not provide small business and residential users with the opportunity to use the high-speed network links in the ISP network dynamically for their applications. Such users do not generally have, or can afford to have, policy servers, edge routers, or traffic shapers so they commonly cannot make use of or afford the different QoS service levels provided by the ISP. ISP's do not provide (push) the network occupancy/availability of varying levels of bandwidth/QoS available in their network to the end users when they logon. Therefore, such users cannot avail themselves of higher speeds even when the ISP network is not loaded (off peak). In contrast to the overuse of resources when peak Internet traffic levels are experienced, this incapability of ISP's causes under use (or wastage) of resources when off-peak Internet traffic levels are experienced.

SUMMARY

These and other needs are addressed by the various embodiments and configurations of the present invention.

The present invention is directed generally to a system that provides users with enhanced service when a public network has a determined amount of available resources.

In a first embodiment, the present invention provides a method that includes the steps:

(a) determining that public network resources are available for use;

(b) determining that a first class of users will be offered an upgrade in a Quality of Service (QoS) of communications over the public network;

(c) determining that a first user in the first class of users may intend to use the public network resources; and (d) providing the user with the higher QoS when the first user accesses the public network. As used herein, "quality of service" refers generally to a measure of the communication quality provided to a user by a network.

The classes of users are typically defined based on service levels. For example, one class of users may be subject to a Service Level Agreement with the ISP while another class of users is not. Thus, the former class of users is entitled to receive a higher QoS than the latter class of users, in the absence of a service upgrade of the latter user class.

The upgrades are commonly provided on a provisional basis. When resource usage levels in the public network actually rise and/or are likely to rise above selected level(s), the ISP can downgrade the QoS of eligible users as needed to provide another class of users with a guaranteed QoS.

In one configuration, the ISP ingress edge router signals all the QoS levels with different Usage Performance Constraints (or UPC's), that map to suitable applications, back to small business/residential devices so that the corresponding user can decide how much bandwidth they can use for their current session, depending on the time of day. A UPC refers to a QoS parameter or set of QoS parameters, such as minimum bandwidth, maximum packet loss, maximum packet delay, and/or maximum jitter, that is desirable and/or required by an application that the application can or otherwise use along a selected packet route. A common format for UPC's is delay ms, packet loss %, jitter ms. Examples of UPC's include, for E-mail UPC1 (500 ms, 40%, 600 ms), for video UPC2 (200 ms, 10%, 200 ms), and for voice UPC3 (50 ms, 0%, 20 ms). The ISP ingress edge router also informs the user of the time duration during which he/she can use the upgraded bandwidth. The ISP has the right to reduce the bandwidth to the original (what the user paid for) speed if the network becomes congested.

In one configuration, when small business/residential users launch a new application for which the ISP edge router does not have a UPC recommendation, the user's device signals the UPC requirements to the ISP edge router which then feeds back to the small/residential user what bandwidth they can use.

The present invention can permit ISP edge routers to provide dynamically recommendations to small business/residential users of their respective bandwidth utilization limitations depending upon network availability and the time of day. It can provide the ISP edge router with the capability to signal network occupancy/availability back to the end user so that the end user can adapt his/her transmission speed suitably. It can provide higher levels of public network resource usage during normally low usage periods but maintain existing levels of usage during high usage periods. Therefore, small business and residential users can avail themselves of higher speeds even when the ISP network is not loaded (off peak).

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Figure 1:
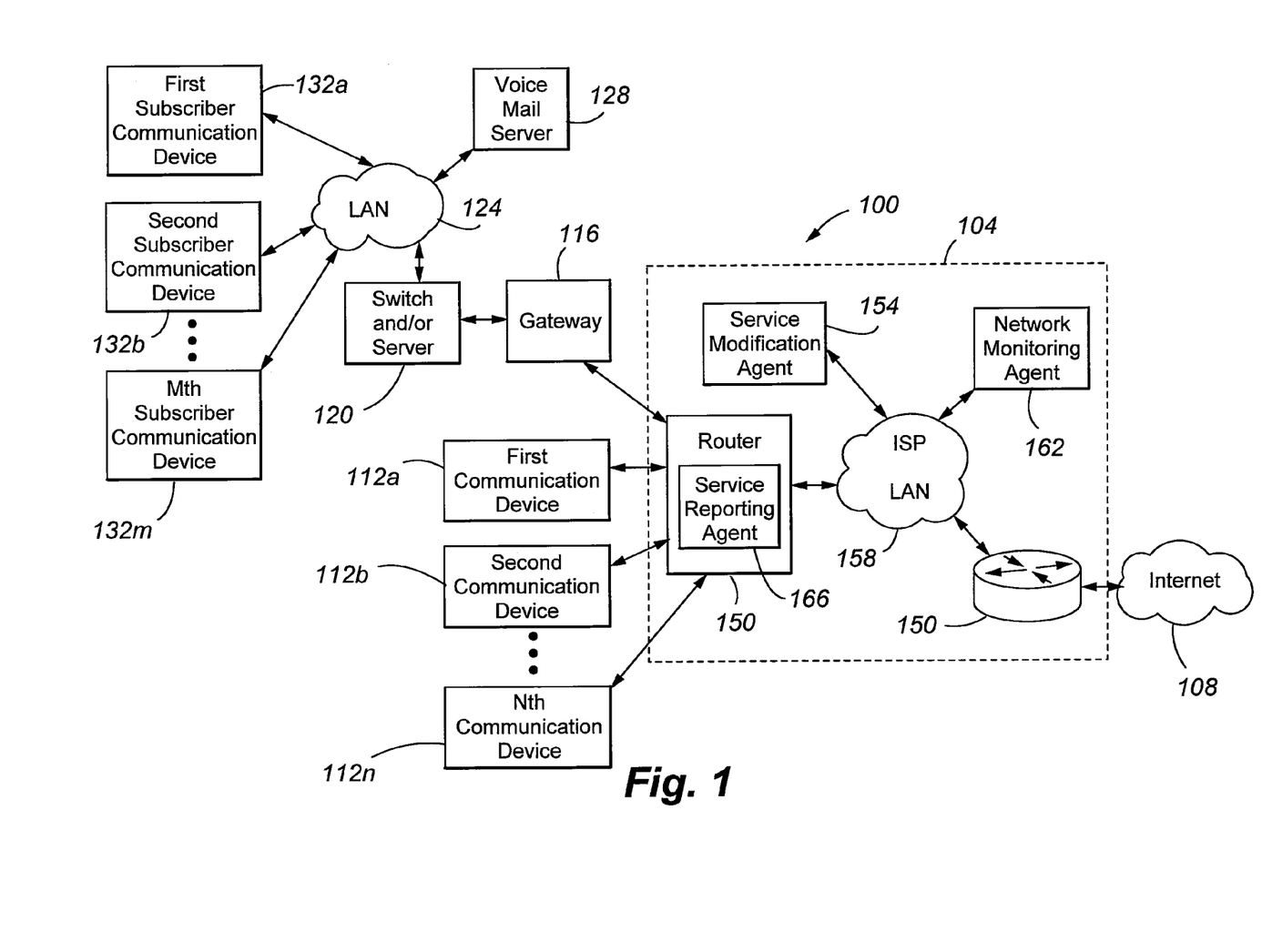
FIG. 1 is a block diagram of a network architecture according to a first embodiment of the present invention.

FIG. 1 is a block diagram showing an architecture according to a first embodiment of the present invention. A network 100 includes an Internet Service Provider system 104 positioned between the Internet 108 and a number of network users. The users include private or residential users corresponding to first, second, . . . nth communication devices 112a-n and an exemplary enterprise user corresponding to a gateway 116, a switch and/or server 120, a Local Area Network or LAN 124, a voice mail server 128, and first, second, . . . mth subscriber communication devices 132a-m. The communication devices 112a-n and 132a-m can be any circuit-switched or packet-switched communication devices, such as Personal Computers or PC's, laptops, Personal Digital Assistants or PDA's, wired or wireless telephones, IP hard phones, IP soft phones, cellular phones, network gaming devices (PlayStation™, XBOX™, and Nintendo™), and network-connected appliances (e.g., television, refrigeration, toaster, oven, furnace, air conditioner, etc.), and the like. The switch and/or server 120, gateway 116, and voice mail server 128 are conventional. The LAN 124 may be circuit-switched or packet-switched. Although only one enterprise user is shown, it is to be understood that a number of enterprise users will generally be served by each ISP 104. It is further to be understood that the enterprise users can have LAN topologies different from that depicted in FIG. 1.

The ISP 104 comprises a plurality of edge routers 150, a service modification agent 154, and a network monitoring agent 162, interconnected by Local Area Network or LAN 158. The service modification agent 154 pushes the occupancy and/or availability of varying levels of bandwidth/QoS available in the LAN 158 and Internet 108 to the edge routers 150 to provide to users when they logon and/or otherwise request access to the Internet 108. The occupancy and/or availability is commonly provided to the user as an offer to receive a higher QoS, which offer may include a listing of the applications the user can run and corresponding QoS parameters, packet/data transmission speed, bandwidth, and/or currently available UPC levels for each application. The network monitoring agent 162 collects network state information, such as by using a network of probes, performance statistics received from ISP edge routers accessing the Internet, SNMP in-line traffic shaping and monitoring devices, and the like, and provides the information to the service modification agent 154. The network state information includes, for example, QoS parameters, such as expressed by packet loss (a packet is generally considered to be "lost" if it does not arrive at a selected destination within a selected period of time), latency or packet delay (which generally measures how much time it takes for a packet of data to get from one designated point to another), and jitter (which generally is a distortion of the interpacket arrival times (the interval between packet arrivals) compared to interpacket times of the original transmission), resource usage/available capacity level(s), available bandwidth (which is commonly a measure (in Kbps, Mbps, Gbps, or Tbps) of the raw data transmission capacity (e.g., how many bits of data can be moved from one host to another in a unit of time under ideal conditions) of a network or a selected portion thereof), available alternate routes in the network that meet Qos/UPC requirements, and the like.

The edge router 150 can be any packet switching and/or routing module. It typically uses policy- and/or constraints-based routing protocol(s). It includes a service reporting agent 166 that provides service upgrade and downgrade information to the user and effects service upgrades and downgrades. The service upgrade and downgrade information is received from the service modification agent 154.

The network performance statistics received by the network monitoring agent 162 from ISP edge routers, the network state information received by the service modification agent 154 from the network monitoring agent 162, and the service upgrade and downgrade information received by the router 150 from the service modification agent 154 are typically contained in traffic engineering packets. When the source of or destination for the packet is a router, the packets are commonly formatted for a routing protocol being used by the edge router. Examples of routing protocols include distance-vector algorithms (e.g., the Bellman-Ford algorithm, Routing Information Protocol or RIP, RIP-2, etc.), link-state algorithms (e.g., Open Shortest Path First or OSPF protocol, OSPF-TE protocol, Intermediate System to Intermediate System or IS-IS, Netware's Link Services Protocol, etc.), and path vector algorithms (e.g., Border Gateway Protocol or BGP, Internal BGP or IBGP and other Internal Gateway Protocols or IGPs, External BGP or EBGP and other External Gateway Protocols or EGPs, etc.). For example, the information may be included in the PRI field(s) or the Request (REQ), Decision (DEC) or Report State (RPT) contents, with PRI and RPT being preferred, as defined by the protocol specified in RFC 3084 (COPS-PR). As will be appreciated, the Common Open Policy Service protocol (COPS) is a scalable protocol that allows policy servers (PDPs) to communicate policy decision to network devices (PEPs) COPS was designed to support multiple types policy clients.

The UPC parameters are the attributes/field relevant to a preferred configuration of the invention. PRI value is considered encoded provisioning instance data, which carry the encoded value of a provisioning instance. The PRI value contains all of the individual values of the attributes that comprise the class (which corresponds to the SMI's xxxEntry Object-Type defining the SEQUENCE of attributes comprising a table [V2SMI] [SPPI]) and is encoded as a series of TLV sub-components. Each sub-component represents the value of a single attribute and is encoded following the BER. The ordering of non-scalar (multiple) attributes within the EPD is dictated by their respective columnar OID suffix when defined in [V2SMI]. Thus, the attribute with the smallest columnar DID suffix appears first, and the attribute with the highest number columnar OID suffix appears last. Further details are set forth in §4.3 of RFC 3084.

In one configuration, the service reporting agent 166, network monitoring agent 162, and/or service modification agent 154 receive, for each path, QoS Usage Performance Constraints (UPC's) that must be met for the various application packets being currently routed and regular updates about possible paths complying with the UPC's. The UPC's that need to be met for various user applications are typically exchanged between the user's communication device and the edge router 150 and contained in a Service Description Protocol or SDP packet, such as in the bandwidth field. The UPC requirements generally include not only the proposed bandwidth to be used by the session or media but also the QoS requirements. The updates about possible paths complying with the UPC's are typically contained in routing protocol packets as noted above.

As will be appreciated, the ISP assigns users to different classes or types of service depending on the service level guarantees and/or requirements in the Service Level Agreement or SLA in place between the user in the ISP or otherwise applicable to the user. For example, a gold class generally refers to large- and mid-sized corporate users, silver class to small- and mid-sized corporate users, and bronze class to small-corporate and residential users. When a silver or bronze user logs on or otherwise requests usage of Internet resources, the service modification agent 154 determines whether or not the resource usage level needed by the user is currently available and, if so, the service reporting agent 166 provides the user with the option of upgrading the user's guaranteed service level in the SLA or unguaranteed but otherwise currently available service level (if the user has no SLA in place with the ISP) (or base service level) to a higher service level providing a higher QoS. The option is typically provided to the users within a class on a first-come-first-served basis. Users in the silver class are generally offered the option preferentially to users in the bronze class. When sufficient resources are available to satisfy likely demand in the silver class, the bronze users become eligible for upgrades.

Figure 2:
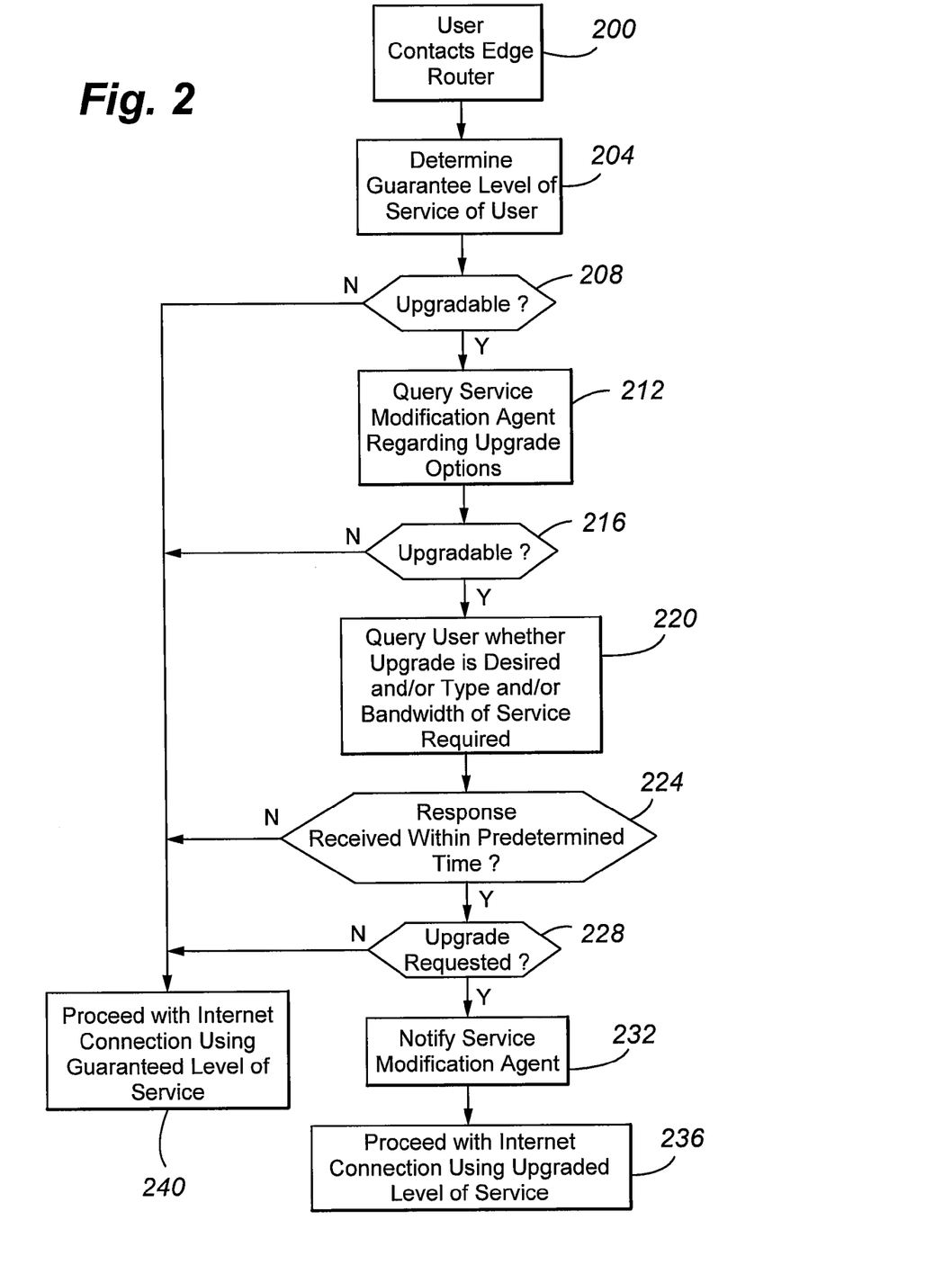
FIG. 2 is a flow chart depicting an operational embodiment of the service reporting agent.

An embodiment of the operation of the present invention will now be described with reference to FIGS. 2-3.

In step 200, a user contacts the edge router 150 requesting Internet access to run an application, such as a Web browser application (e.g., Exchange™ and Netscape™), an instant messaging application, an E-mail application (e.g., Outlook™), a Voice over IP or VoIP application, a video conferencing application, a text chat application, video-on-demand, interactive games, interactive TV/news, and the like.

In step 204, the service level reporting agent 166 in the contacted edge router 150 determines the service class of the user and guaranteed level of service for the user as stipulated in the SLA between the user and the ISP or, if no SLA is in place, the service class of the user. This is typically done by providing a user identifier, such as an IP address, user name, and the like in a query to an interface of an ISP subscriber database or data store (not shown).

Figure 6:
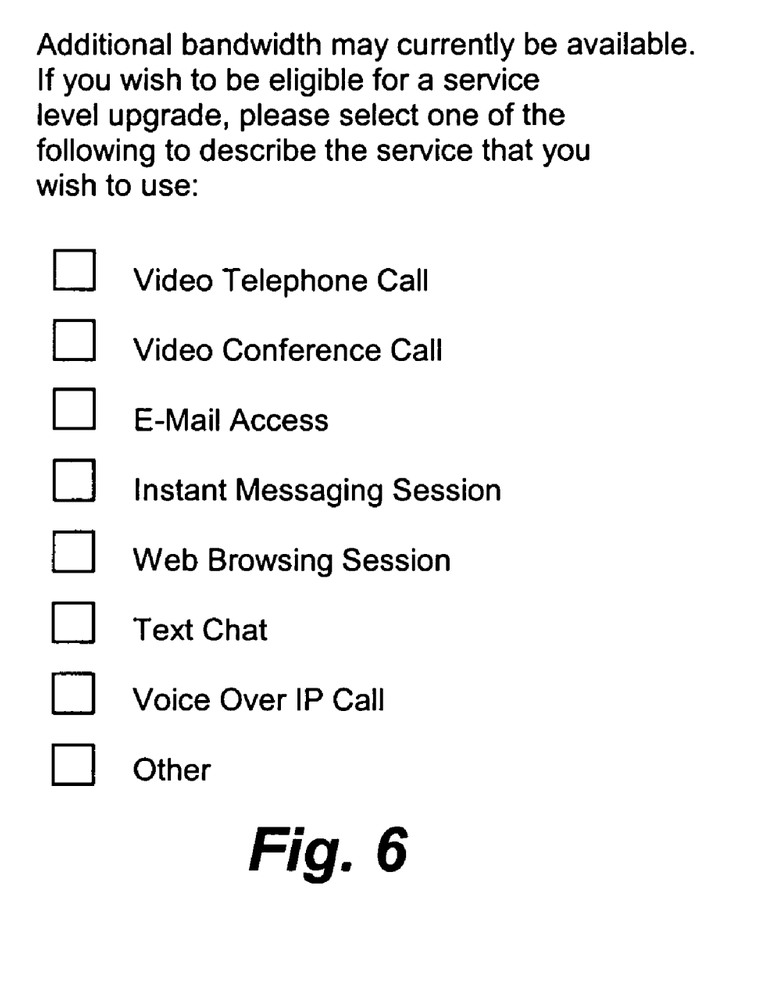
FIG. 6 is a screen shot of a display provided to an upgradable user.

Additionally, the agent 166 determines, in step 204, the application that the user is seeking to run and the QoS requirements and/or UPC's for the application. For previously encountered applications, such as those listed in the prior paragraph, the agent 166 will already know the QoS requirements and/or UPC's. For applications that have not been previously encountered, the agent 166 will query the application for the QoS requirements and/or UPC's. Alternatively, the agent 166 may provide the user with a graphical message such as that shown in FIG. 6. The message requests the user to select the application that he/she wishes to run and, if unlisted, to describe the application in more detail. For example, the user may be running several applications and simply wants to use a set amount of bandwidth for a specified period of time. When the user has selected the appropriate option, the user clicks the "send" button. The agent 166 will map the selected option to determine the appropriate QoS level/UPC's/bandwidth needed by the user.

In decision diamond 208, the agent 166 determines whether the user is upgradable. For example, if the user is already in the gold class there is nothing to upgrade him or her to. They are already at the highest service level. If the user is in the bronze class, the user may not currently be eligible for upgrade because upgrades are currently being offered only to silver class users. In the latter case, the service modification agent 154 can provide periodically to the various agents 166 in the edge router notifications as to which user classes are currently eligible for upgrades. Typically, users in the bronze class are only eligible for upgrades if there are sufficient Internet resources available both for silver and bronze class user upgrades. This is typically determined by comparing a current network usage level (e.g., measured by bandwidth in use, available unused bandwidth, a packet loss, packet latency, jitter, resource usage level, etc.) against a selected threshold. If the usage level is less than or equal to the threshold, the agent 154 determines that silver users and bronze users are eligible to be upgraded. Additionally if the ISP cannot offer a user in a service class a higher QoS for the particular application to be run the user is not considered to be upgradable, even though the user is otherwise eligible for an upgrade.

If the user is deemed to be upgradable, the service reporting agent 166, in step 212, queries the service modification agent 154 to determine the upgrade options for the user. The query typically includes the user's service class and/or identifier, the application to be run by the user, the QoS requirements and/or UPC's of the application, and/or the network resources (e.g., bandwidth) required by the application. In one configuration, one of the agents 154 and 166 maps the application to one or more QoS levels, for each of the corresponding QoS levels, maps the QoS level(s) to corresponding UPC's, and the UPC's for each selected QoS level to a corresponding bandwidth requirement for the application. Alternatively, the agent may map the application directly to the bandwidth required for one or more QoS levels. To avoid bandwidth piracy, when the agent 166 encounters an application that it has not previously encountered, the agent 166 queries the application for a required or desired QoS level, QoS parameter(s), UPC(s), and/or bandwidth. This prevents the user from consuming too much bandwidth and preventing other users in the same class from being upgraded.

Figure 3:
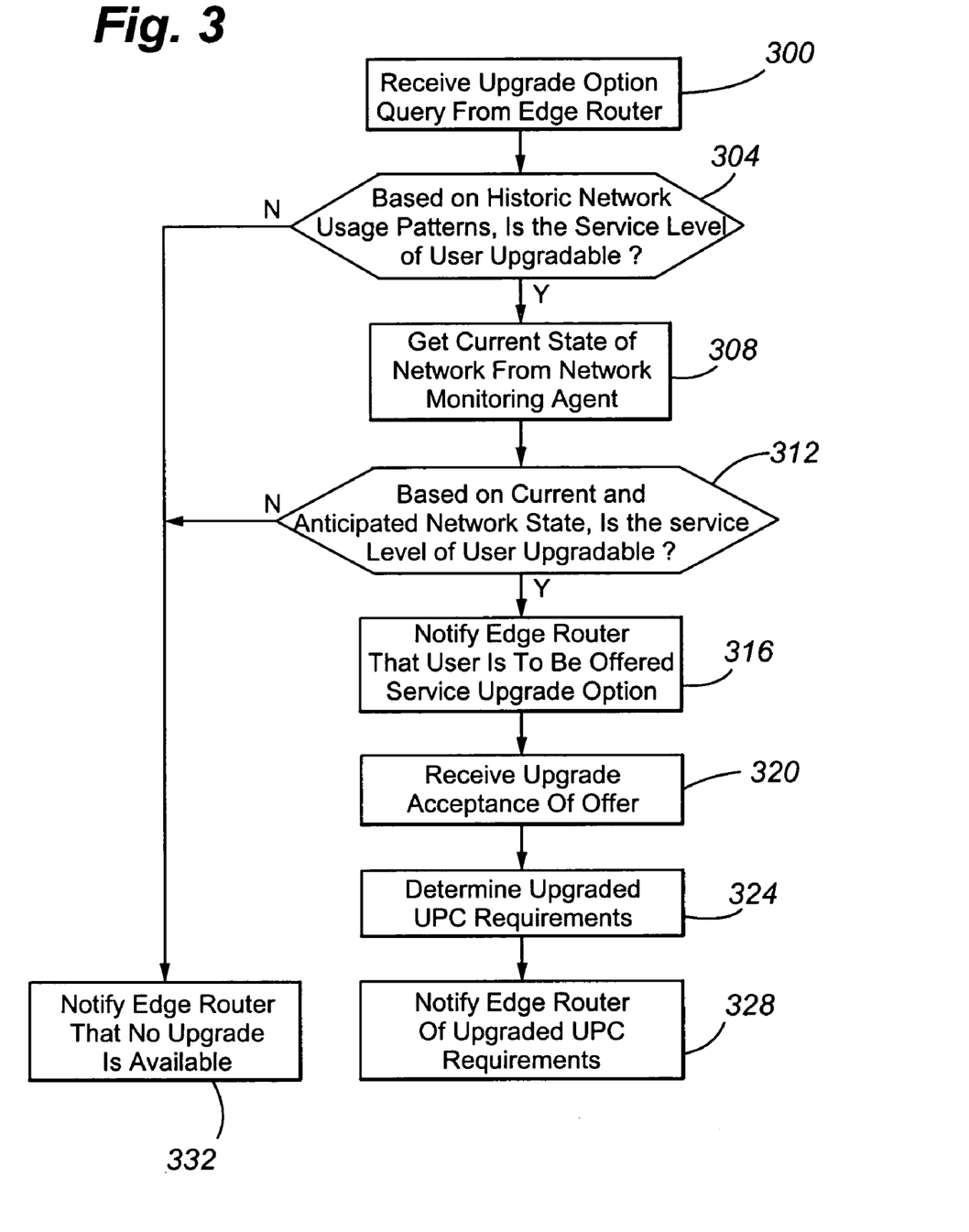
FIG. 3 is a flow chart depicting an operational embodiment of the service modification agent.

Referring to FIG. 3, the service modification agent 154 receives the query from the service reporting agent 166 and, in decision diamond 304, determines the upgrade options. The determination may be made in many ways. For example, the agent 154 may determine from historic network usage patterns and the UPC's and/or bandwidth requested by the user whether the user is currently upgradable. By way of illustration, if the user is seeking to run the application during a period of high historic Internet usage the ISP concludes that the upgrade is not desirable. Conversely, if the user is seeking to run the application during a period of low historic Internet usage the ISP concludes that an upgrade is desirable. Alternatively, decision diamond 304 may have a historic usage table providing for each of a number of daily time intervals and days of week whether a user in a given user class is upgradable. For example, in an off-peak time period from 6 pm to 10 pm, silver users are upgradable while bronze users are not while in an off-peak time period from 10 pm to midnight, both silver and bronze users are upgradable.

In step 308, the agent 154 queries and receives from the network monitoring agent 162 the current network state information and, in decision diamond 312, determines, based on the current network state information and bandwidth requested by the user, whether the user is currently upgradable. The agent 154 upgrades users only if the current network state information coupled with commitments made to previously upgraded users who have not started using the upgraded bandwidth still provides sufficient bandwidth to upgrade the user for operating the intended application. In one configuration, the ISP may set an upper limit on all users in lower service classes as to how much bandwidth they may be upgraded to. Thus, if the bandwidth requested by the user's application exceeds that limit, the user may be permitted to proceed but be limited to the maximum bandwidth allocated to each user in a service class. In another configuration, decision diamond 304 is not performed. In other words, the ISP considers only current network state information and user requested bandwidth in determining whether to upgrade the user. By way of illustration, if the user is seeking to run the application during a period of high historic Internet usage but the current Internet usage level is well below the historic level the ISP may nonetheless conclude that the upgrade is not desirable. Conversely, if the user is seeking to run the application during a period of low historic Internet usage but the current Internet usage level is higher than the historic level the ISP may nonetheless conclude that an upgrade is desirable.

If the user is upgradable, the agent 154, in step 316 notifies the service reporting agent in the edge router that the user may be upgraded and, if appropriate, the QoS, UPC's, and/or bandwidth to which the user may be upgraded.

Returning again to FIG. 2 in step 220, the agent 166 notifies the user that a service upgrade may be available and queries the user whether the upgrade is desired and/or the type and/or bandwidth of service required. In decision diamond 224, the agent 166 determines whether or not a user response was received within a predetermined time. If so, the agent 166, in decision diamond 228, determines whether or not an upgrade was requested. If so, the agent 166 notifies the modification agent in step 232. The agent 166, in step 236, then proceeds with the Internet connection requested by the user using the upgraded level of service.

If in either of decision diamonds 208 or 216, the user is not upgradable, if, in decision diamond 224, no response is received from the user within a predetermined time, or if, in decision diamond 228, the user does not request an upgrade, the agent 166, in step 240, proceeds with the Internet connection using the base service level of the user.

Referring again to FIG. 3, the service modification agent 154 receives notification from the service reporting agent 166 that the user has accepted the upgrade offer. In step 324, the agent 166 determines the upgraded UPC requirements and, in step 328, notifies the router 150 of the upgraded UPC requirements. Alternatively, when the agent 154 determines the UPC requirements, the agent 166 simply notifies the agent 154 that the user has selected the upgrade option.

If in either of decision diamonds 304 or 3126, the user is not upgradable, the agent 154, in step 332, notifies the agent 166 that no upgrade is currently available for the user.

As noted, the service level upgrade is offered on a provisional basis. If the network resource level usage increases above a selected threshold, the service modification agent 154 begins downgrading users appropriately to maintain compliance with the SLA's of gold class users. Typically, the bronze class users are downgraded before silver class users, and users within a user class are downgraded in reverse chronological order; that is, the most recently upgraded users are downgraded before the oldest upgraded users.

Figure 4:
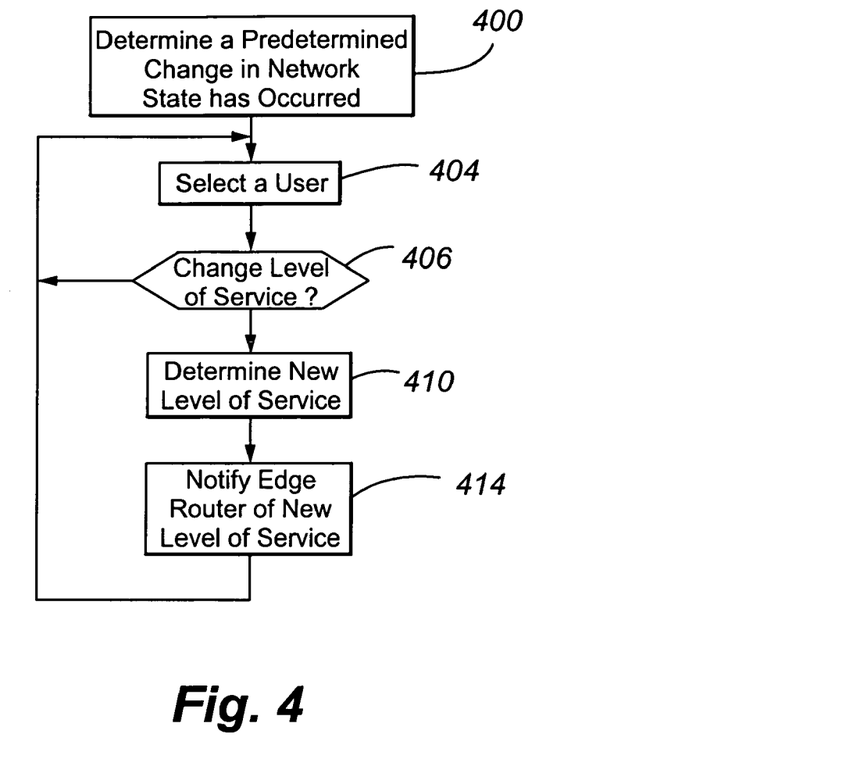
FIG. 4 is a flow chart depicting an operational embodiment of the service modification agent.
Figure 7:
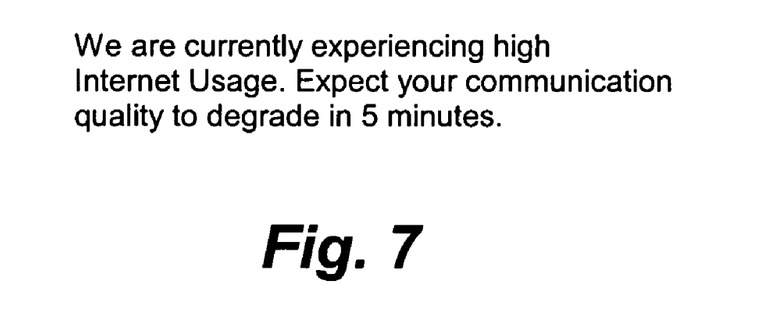
FIG. 7 is a screen shot of a display provided to an upgraded user that is eligible to be downgraded.

An operational embodiment of the invention for implementing the service downgrading functionality will now be discussed with reference to FIGS. 4-5 and 7.

In step 400, the service modification agent 154 determines that a predetermined change in network state has occurred or will occur in a predetermined time. This determination is made frequently based on current network state information received from the network monitoring agent 162. Typically, a determined change is deemed to have taken place when one or monitored network performance patterns, such as a QoS or UPC parameter, resource usage/available capacity level(s), available bandwidth, and available alternate routes in the network that meet Qos/UPC requirements exceeds a corresponding selected threshold value and/or a time interval of high historic resource usage is arriving within a specified time.

In response, the agent 154 selects, in step 404, a first user in a selected service class and determines, in decision diamond 406, whether the user has had an upgrade in his or her level of service. If the user's service level has not been upgraded, the agent 154 returns to step 404 and selects a next user. If the user's service level has not been upgraded, the agent, in step 410, determines a new level of service for the selected user. The new level of service may be the level set forth in the user's respective SLA (or the base service level to which the user is otherwise entitled) or a higher level that is lower than the current level. The level is typically determined by mapping the application that the user is currently running against QoS level to determine the current QoS level, selecting a new lower QoS level, mapping the new QoS level against UPC's to determine the corresponding UPC's, and finally mapping the UPC's against bandwidth to determine the bandwidth to which the user will be downgraded. For example, the agent 154 may determine that all silver users are to be downgraded to the next lowest QoS level to free up bandwidth. The next lowest QoS level may still be upgraded relative to the QoS level specified in the SLA (or the base service level to which the user is otherwise entitled). In step 414, the agent 154 notifies the service reporting agent 150 of the new level of service.

Figure 5:
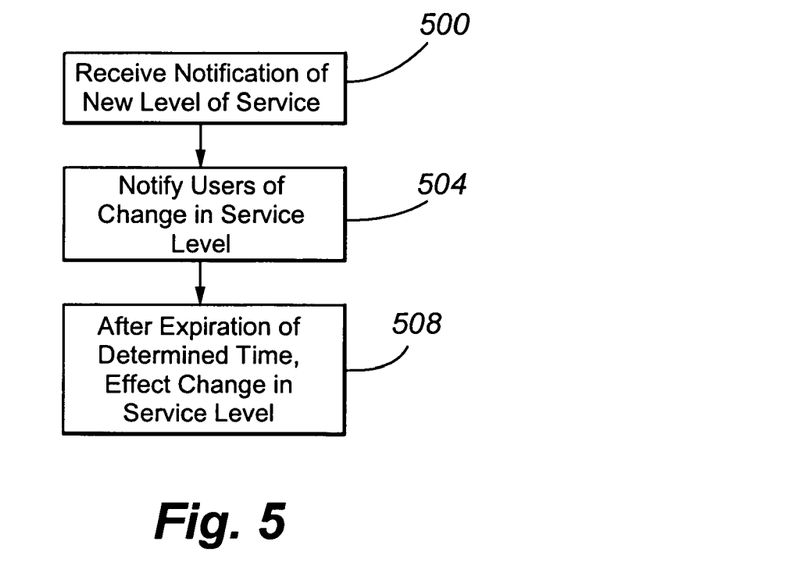
FIG. 5 is a flow chart depicting an operational embodiment of the service reporting agent.

Referring now to FIG. 5, the service reporting agent 166, in step 500, receives from the service modification agent the service level downgrade notification and, in step 504, notifies the user of the change in service level. An exemplary service level downgrade message displayed to the user is shown in FIG. 7. After expiration of the determined time (which is shown in FIG. 7 as being five minutes), the router 150, in step 508, effects a change in the user's service level. The change is typically evidenced to the user as a lower quality of service. The user's session itself is not forcibly terminated.

A simple example will now be provided to illustrate the operation of an embodiment of the present invention. A user, Sanjay Patel, is a small business Indian operator who mainly meets the IT outsourcing needs of the western countries. His typical work time is different than normal business working hours, and he has paid a flat monthly fee to his service provider (TATA) for an adaptive internet connection as described by the present invention. Sanjay logs on to the network around 12 am using his standard modem speed of 56 k. Once Sanjay is authenticated, the ISP edge router signals (shown as a Radio button dialog on the user screen) to Sanjay that, for his type of connection, he can choose to use 4 Mbps until 6 am that morning; however, if the ISP network begins to congest before that time, the ISP will notify Sanjay and force him back to 56 k. The ISP edge router also provides a list of recommended applications (voice and video over IP (VoIP), video teleconferencing, video-on-demand, interactive games, interactive TV/news, or SAP, etc.) that Sanjay can now use at the speed that he is getting (4 Mbps). Around 4 am, the ISP network begins to congest due to a file backup of a large enterprise customer. The ISP notifies Sanjay that his modem will now have to drop down to 56 k again. Sanjay accepts this downgrade as this is what he has paid for.

A number of variations and modifications of the invention can be used. It would be possible to provide for some features of the invention without providing others. For example in one alternative embodiment, the ISP uses the upgrade as an opportunity to inform the user of open source software for downloading or closed source software for purchase and downloading and provides to the user a hyperlink to the software provider. This can be done, for example, when the user is notified of an upgrade to his or her service. He/she is then provided with a list of applications that he/she can now run. The ISP can charge the user and/or software vendor for the user downloading the software. This not only generates revenue for the ISP and software vendors but also notifies users of potentially beneficially software. Many users are unable to keep abreast of new software developments and continue to use outdated and less efficient software.

In another alternative embodiment, the service modification agent 154 provides to the service reporting agent 166 periodic notifications as to the availability of upgrades by class of user, the necessity of downgrades by class of user, the types of upgrades currently available (e.g., by user service class the applications that may be upgraded, the maximum QoS and/or bandwidth to which a user in a given class may be upgraded, and the like). This embodiment can reduce, relative to other configurations, the amount of additional traffic transmitted over the LAN 158. Other configurations generally require, on a user-by-user basis, an exchange of packets among the service reporting agent 166, service modification agent 154, and network monitoring agent 162. In contrast, this embodiment simply broadcasts to the various edge routers 150 when upgrades are available and to whom they are available. Conversely, the embodiment broadcasts to the edge routers 150 when downgrades are to be implemented and who is to be the subject of the downgrades.

In yet another embodiment, the user is charged for the upgraded service. This can, for example, be done on a flat fee or a temporal or packet sent basis.

In yet a further embodiment, the various computational modules discussed herein can be implemented in software, hardware (such as a logic circuit), or combinations thereof and functionally may be combined or otherwise altered to perform one or more of the functions discussed herein.

In yet a further embodiment, the present invention is used with a long distance wireless network, such as a network using a wireless access protocol, with the Wi-Fi or WiMax protocols being examples, to control user access to the network.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) automatically determining, by a service reporting agent, that first and third users may intend to access the Internet;
   (b) automatically determining, by the service reporting agent, that the first and third users, pursuant to a service level agreement with an Internet Service Provider ("ISP"), are each entitled to receive a first level of Internet service, wherein different Internet service level agreements of the ISP with different users have different levels of service;
   (c) automatically determining, by a service modification agent, that a usage level of the Internet when the first and third users access the Internet is less than a selected threshold;
   (d) automatically determining whether the first and third users are currently upgradable;
   (e) in response to determining that the Internet usage level is less than the selected threshold and that the first user is currently upgradable, automatically providing, by the service reporting agent, the first user with a second level of service provided in a second service level agreement with a different customer when the first user accesses the Internet, the second level of service being of a higher quality than the first level of service;
   (f) in response to determining that the Internet usage level is less than the selected threshold and that the third user is not currently upgradable, automatically not providing, by the service reporting agent, the third user with the second level of service when the third user accesses the Internet;
   wherein the service reporting agent receives usage performance constraints from the ISP, the constraints mapping to a set of applications complying with the constraints, and provides the constraints and/or set of applications to the first user to enable the first user to determine what applications can be used by the first user; and
   wherein the constraints comprise a plurality of minimum bandwidth, maximum packet loss, maximum packet delay, and maximum jitter, wherein the constraints correspond to the second level of service and wherein the service reporting agent provides the first user with a time limit for the first user's upgrade to the second level of service.

2. The method of claim 1, wherein the first level of service is a base service level, wherein the service modification agent determines that a second usage level of the Internet when a second user accesses the Internet is greater than the selected threshold, and, in response, the service reporting agent provides the second user with the first level of service when the second user accesses the Internet, wherein the service reporting agent is in a router, wherein the service modification agent is part of an enterprise network of the ISP, and wherein the first, second, and third users are residential users.

3. The method of claim 2, wherein the first and third users are members of a first class of users and the second user is a member of a second class of users and wherein the second user is not provided with the second level of service.

4. The method of claim 1, wherein the level of service stipulates at least one of a minimum bandwidth level, minimum Quality of Service ("QoS"), and delivery rate and wherein the determining step (c) comprises at least one of the following substeps:
   (C1) determining, by the service modification agent, that a historic usage level of Internet resources is less than the selected threshold; and
   (C2) determining, by the service modification agent and based on network state information, that an actual usage level of Internet resources is less the selected threshold.

5. The method of claim 4, wherein each of the first and third users intends to execute different first and third applications when accessing the public network and wherein the determining step (d) comprises:
   (D1) determining, by the service reporting agent, at least one of a usage performance constraint, QoS parameter, and bandwidth requirement of the first and third applications and
   (D2) determining, by the service modification agent and based on the at least one of a usage performance constraint, QoS parameter, and bandwidth requirement of the first and third applications, that the first user, but not the second user, is upgradable to the second level of service.

6. The method of claim 4, further comprising:
   (g) subsequently determining, by the service modification agent, that the usage level of Internet resources is more than the selected threshold; and
   (h) in response to step (g), downgrading, by the service modification agent, the first user to the first level of service.

7. The method of claim 4, wherein step (e) comprises:
   (E1) notifying, by the service reporting agent, the first user of an option to upgrade to the second level of service from the first level of service;

(E2) in response to the first user accepting the option, providing, by the service modification agent, the user with the second level of service; and (E3) in response to the first user failing to accept the option, providing, by the service modification agent, the user with the first level of service.

8. A non-transitory computer readable medium comprising computer executable instructions operable, when executed, to perform the steps of claim 1.

9. A method, comprising:

(a) receiving requests, from first and third subscribers, for Internet access to run first and third applications, respectively;

(b) automatically determining, by a service level reporting agent, a corresponding service class of the first and third subscribers and a guaranteed level of service to be provided by an Internet Service Provider ("ISP"), wherein a corresponding level of service stipulates at least one of a minimum bandwidth level, minimum Quality of Service ("QoS"), and delivery rate, the first and third subscribers having a same level of service;

(c) automatically determining, by a service modification agent, that the first subscriber, but not the third subscriber, is upgradable to a second level of service, the second level of service providing a greater access to Internet resources than the first level of service, the second level of service being offered to a different second subscriber in a different service level agreement with the ISP;

(d) automatically providing, by the service modification agent, the first subscriber, but not the third subscriber, with the second level of service;

wherein the service reporting agent receives usage performance constraints from the ISP, the constraints mapping to a set of applications complying with the constraints, and provides the constraints and/or set of applications to the first user to enable the first user to determine what applications can be used by the user; and wherein the constraints comprise a plurality of minimum bandwidth, maximum packet loss, maximum packet delay, and maximum jitter, wherein the constraints correspond to the second level of service and wherein the service reporting agent provides the first user with a time limit for the first user's upgrade to the second level of service.

10. The method of claim 9, wherein the service modification agent's determination of whether either or both of the first and third subscriber is upgradable depends upon a plurality of the service class of the first and third subscriber, the first and third applications, the Quality of Service requirements of the first and third applications, the Usage Performance Constraints of the first and third applications, and the Internet resources required by the first and third application and wherein the service reporting agent executes in a router.

11. The method of claim 9, wherein, in step (c), the determination by the service modification agent is based on a historic Internet usage pattern during a selected time period and wherein the service modification agent is part of an enterprise network of the ISP.

12. The method of claim 9, wherein, in step (c), the determination by the service modification agent for a selected one of the first and third subscribers compares current network state information respecting the Internet with the plurality of the service class of the first and third subscriber, a corresponding one of the first and third applications, the Quality of Service requirements of the corresponding one of the first and third applications, the Usage Performance Constraints of the corresponding one of the first and third applications, and the Internet resources required by the corresponding one of the first and third applications.

13. The method of claim 12, wherein the first subscriber is upgradable in response to the service modification agent determining that a sufficient quantity of available Internet resources, after considering the current network state information and service level upgrade commitments made to previously upgraded subscribers, the previously upgraded subscribers not having yet used Internet resources associated with the upgrade, to support the first application.

14. The method of claim 9, wherein the Internet Service Provider has set an upper upgradable bandwidth limit on subscribers in a selected service class.

15. The method of claim 9, wherein step (c) comprises the sub-step:

(C1) notifying, by the service reporting agent, the first subscriber that a service upgrade is available, the notification querying the first subscriber whether the first subscriber wishes to accept the upgrade and/or a type and/or bandwidth of service required, wherein the first subscriber accepts the upgrade offer.

16. The method of claim 9, wherein the upgrade is provided by the service modification agent on a provisional basis and may be downgraded by the service modification agent to the first level of service in response to a change in Internet state.

17. A non-transitory computer readable medium comprising computer executable instructions operable, when executed, to perform the steps of claim 9.

18. A system, comprising:

(a) a service modification agent operable to:

(i) automatically determine that Internet resources are available for use;

(ii) automatically determine that selected members of a first class of users will be offered an upgrade to a second Quality of Service (QoS) of communications over the Internet, each of the users, including first and third users, in the first class being subject to a service level agreement with an Internet Service Provider ("ISP"), the service level agreement guaranteeing a first QoS, the first QoS being lower than the second QoS guaranteed by the ISP in service level agreements with users in a different second class of users;

(iii) automatically determine that a first and third users in the first class of users intend to use the Internet;

(b) at least one router comprising a service reporting agent operable, when the service modification agent determines that Internet resources are available for use, to provide automatically the first user, but not the third user, with the higher second QoS when the first and third users access the Internet;

wherein the service reporting agent receives usage performance constraints from the ISP, the constraints mapping to a set of applications complying with the constraints, and provides the constraints and/or set of applications to the first user to enable the first user to determine what applications can be used by the user; and wherein the constraints comprise a plurality of minimum bandwidth, maximum packet loss, maximum packet delay, and maximum jitter, wherein the constraints correspond to the second level of service and wherein the service reporting agent provides the first user with a time limit for the first user's upgrade to the second level of service.

19. The system of claim 18, wherein the service modification agent, at least one router, and network are operated by the ISP, wherein the first QoS corresponds to a base service level, and wherein each of the first and third users is a residential user.

20. The system of claim 18, wherein a second user is a member of the second class of users, wherein the second user requests Internet access at the same time as the first user, and wherein the second user is not provided with a QoS upgrade.

21. The system of claim 18, wherein the determining operation (i) comprises a suboperation of determining that a historic usage level of Internet resources is less than the selected threshold.

22. The system of claim 18, wherein the first user intends to execute a first application when accessing the Internet, wherein the third user intends to execute a third application when accessing the Internet, and wherein the service modification agent is operable further to (iv) determine at least one of a usage performance constraint, QoS parameter, and bandwidth requirement of each of the first and third applications and (v) determine, based on the at least one of a usage performance constraint, QoS parameter, and bandwidth requirement of a respective one of the first and third applications, that the first user is upgradable to the second QoS and that the third user is not upgradable to the second QoS.

23. The system of claim 18, wherein the service modification agent is further operable to (iv) subsequently determine that a second usage level of Internet resources is more than the selected threshold; and wherein the service reporting agent, in response to a determination that the second usage level of Internet resources is more than the selected threshold, is further operable to downgrade the first user to the first QoS.

24. The system of claim 23, wherein the service reporting agent is further operable to notify the first user of the option to upgrade to the second QoS; in response to the first user accepting the option, perform the providing operation; and in response to the first user failing to accept the option, provide the first user with the first QoS.

* * * * *